US012551403B2

(12) United States Patent
Knotts et al.

(10) Patent No.: US 12,551,403 B2
(45) Date of Patent: Feb. 17, 2026

(54) BLISTER CAVITY OPENING FEATURE

(71) Applicant: WestRock MWV, LLC, Atlanta, GA (US)

(72) Inventors: James D. Knotts, Glen Allen, VA (US); Marty Jones, Midlothian, VA (US)

(73) Assignee: WestRock MWV, LLC, Atlanta, GA (US)

( * ) Notice: Subject to any disclaimer, the term of this patent is extended or adjusted under 35 U.S.C. 154(b) by 0 days.

(21) Appl. No.: 18/697,229

(22) PCT Filed: Oct. 4, 2022

(86) PCT No.: PCT/US2022/045675
§ 371 (c)(1),
(2) Date: Mar. 29, 2024

(87) PCT Pub. No.: WO2023/059638
PCT Pub. Date: Apr. 13, 2023

(65) Prior Publication Data

US 2025/0041158 A1 Feb. 6, 2025

Related U.S. Application Data

(60) Provisional application No. 63/251,952, filed on Oct. 4, 2021.

(51) Int. Cl.
*A61J 1/03* (2023.01)

(52) U.S. Cl.
CPC .................................... *A61J 1/035* (2013.01)

(58) Field of Classification Search
CPC ........... A61J 1/035; A61J 1/03; B65D 75/327; B65D 75/326; B65D 75/325
USPC ........................................ 206/531, 528, 538
See application file for complete search history.

(56) References Cited

U.S. PATENT DOCUMENTS

| | | | | |
|---|---|---|---|---|
| 3,948,394 A * | 4/1976 | Hellstrom | B65D 75/326 206/520 |
| 5,323,907 A | 6/1994 | Kalvelage | |
| 5,613,609 A * | 3/1997 | Hamilton | A61J 1/035 206/532 |
| 7,243,798 B2 * | 7/2007 | Buss | B65D 75/327 206/532 |
| 2002/0166792 A1 * | 11/2002 | Filion | B65D 75/367 206/532 |
| 2015/0096920 A1 * | 4/2015 | Trombley | B65D 75/367 206/531 |
| 2020/0079565 A1 * | 3/2020 | Bartolucci | A61J 1/035 |
| 2021/0113432 A1 * | 4/2021 | Lefteri | B65D 75/585 |

* cited by examiner

*Primary Examiner* — Steven A. Reynolds
(74) *Attorney, Agent, or Firm* — Brian J. Goldberg; Rohini K. Garg

(57) ABSTRACT

A packaging comprising: (a) a blister having a cavity; (b) a foil disposed over an opening of the cavity and secured to the blister; and (c) a board disposed over the foil having a hole, wherein a shape of the hole is formed by an outer perimeter and the outer perimeter includes an opening feature that pierces or tears the foil during opening of the blister due to a force being applied to the opening feature.

18 Claims, 6 Drawing Sheets

BLISTER CAVITY OPENING FEATURE

CROSS-REFERENCE TO RELATED APPLICATION

The present application claims the benefit of priority to U.S. Provisional Patent Application Ser. No. 63/251,952 filed on Oct. 4, 2021, the entire contents of which is incorporated herein by reference in its entirety.

FIELD

The present teachings generally relate to blister cards, and more particularly, to packaging with blister cavity opening features.

BACKGROUND

Blister packs are frequently used for a variety of consumer goods that are generally smaller in size and purchased in volume. While blister packs are used in a variety of consumer industries, the pharmaceutical industry often utilizes blister packs as a means for unit-dose packaging of pharmaceuticals that may be in the form of tablets, capsules, lozenges, or a combination thereof. The blister packs may be used to divide individual tablets, capsules, lozenges, or a combination thereof within formed cavities in the blister card sealed by a foil or film disposed over the cavities. A user of the blister pack may then puncture or split the foil or film to remove the individual pharmaceutical, thereby leaving the remaining pharmaceuticals sealed.

Often times, a blister card may be joined to a board to protect the foil, the blister card, or both. The board may include holes that align with the cavities of the blister card so that a user may express the tablets, capsules, lozenges, or a combination thereof through the foil. To express the pharmaceuticals, a user may often apply a force to the blister card in a general area of the cavity to push the pharmaceuticals against an inner surface of the foil. The foil may then rupture, thereby expressing the pharmaceuticals. However, often times a significant application of force is needed to rupture the foil. As a result, users may have a difficult time opening the blister card, resulting in damage to the blister pack, damage or dropping of the pharmaceuticals, or both.

Therefore, there remains a need for a more user-friendly packaging. What is needed is packaging that decreases the force needed to rupture the foil disposed over cavities of the blister. There also remains a need for packaging that punctures or tears the foil. What is needed is packaging having an opening feature that interacts with the foil to puncture or tear the foil. Additionally, there remains a need for packaging having an opening feature integrated into the packaging without the addition of extra components. What is needed is packaging having an opening feature integrated into the board of the packaging.

SUMMARY

The present teachings meet one or more of the present needs by providing: a packaging comprising: (a) a blister having a cavity; (b) a foil disposed over an opening of the cavity and secured to the blister; and (c) a board disposed over the foil having a hole, wherein a shape of the hole is formed by an outer perimeter and the outer perimeter includes an opening feature that pierces or tears the foil during opening of the blister.

The present teachings meet one or more of the present needs by providing a packaging, wherein: during opening of the blister, a force is applied to the cavity to compress the cavity and push the foil against the opening feature; the board is heat-sealed to the blister; the opening feature extends inwardly towards a central portion of the hole; the opening feature extends outwardly away from a central portion of the hole; the opening feature forms a point or corner that ruptures the foil; opening of the blister is completed to express a pill located in the cavity; the opening feature is free of contact with the pill during expression; the opening feature contacts the pill during expression, and the opening feature flexes to allow the pill to be removed from the cavity; a force to flex the opening feature is greater than a force to rupture the foil; the opening feature is a pair of opening features disposed on opposing sides of the outer perimeter; the opening feature is a tooth forming a single point to rupture the foil; the opening feature is a cutout along the outer perimeter, and the cutout forms a corner to rupture the foil; the outer perimeter and the opening feature form a keyhole shape; or a combination thereof.

The present teachings may also meet one or more of the present needs by providing packaging, wherein: the opening feature is monolithically formed with the outer perimeter; the outer perimeter is defined by an interior edge of the board; the foil is coextensive with the board; the foil seals the cavity to prevent contamination of an item located inside the cavity; a force to rupture the foil with the hole having the opening feature is less than a force to rupture the foil with a hole free of any opening feature; the opening feature is positioned substantially along a longitudinal axis of the hole, a latitudinal axis of the hole, or both; or a combination thereof.

The present teachings may meet one or more of the present needs by providing packaging that includes an opening feature that ruptures the foil during opening of the blister due to a force being applied to the opening feature. The opening feature may be deflected towards the foil to open the foil. The opening feature may include one or more score lines that determine a flexing point of the opening feature. The score line may at least partially extend through a thickness of the board to define an end of the opening feature that opposes an end of the opening the that contacts the foil. Additionally, the opening feature may be a pair of points that contact and rupture the foil.

Additionally, the present teachings meet one or more of the present needs by providing: a more user-friendly packaging; packaging that decreases the force needed to rupture the foil disposed over cavities of the blister; packaging that punctures or tears the foil; packaging having an opening feature that interacts with the foil to puncture or tear the foil; packaging having an opening feature integrated into the packaging without the addition of extra components; packaging having an opening feature integrated into the board of the packaging; or a combination thereof.

DETAILED DESCRIPTION

Figure 1:
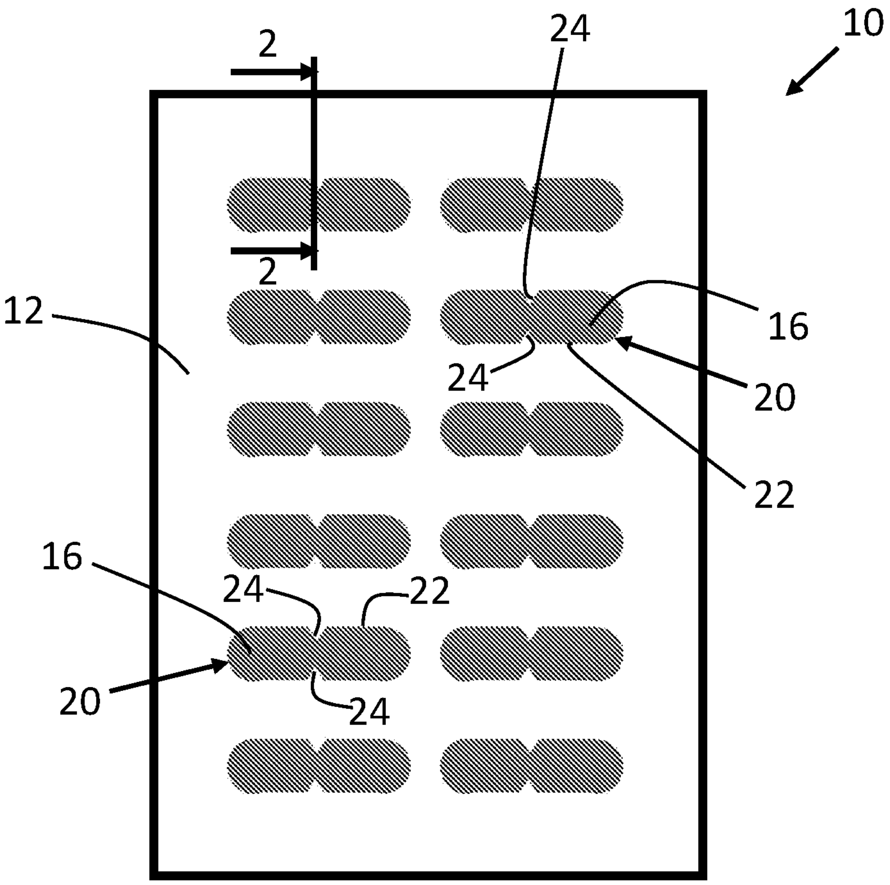
FIG. 1 is a top view of packaging in accordance with the present teachings.

The present teachings generally relate to packaging. The packaging may function to secure one or more items during transportation, storage, or both. The packaging may include one or more blisters. The packaging may include one or more cavities, one or more apertures, one or more holes, or a combination thereof. The packaging may be any size and shape for a desired product. For example, the packaging may be shaped substantially similar to one or more items secured within the packaging to decrease the overall dimensions of the packaging. Alternatively, or in addition, the packaging may include one or more tabs or extensions around a peripheral edge to secure the packaging to one or more displays in a store. The packaging may be structurally rigid. The packaging may be substantially or partially flexible.

The packaging may be configured for a variety of industries. The packaging may be used to store, transport, or both one or more items used in the pharmaceuticals, construction, automotive, aeronautical, other consumer industries, or a combination thereof. It is contemplated that the packaging may be customizable to meet the demands or requirements of a desired product. For example, the packaging may include one or more protective coatings, materials, or both to protect the packaging. The one or more protective coatings, materials, or both may be moisture-resistant, heat-resistant, debris-resistant, puncture-resistant, tear-resistant, ultraviolet (UV) resistant, antimicrobial, antifungal, or a combination thereof. The one or more protective coatings, materials, or both may then be selected based on a desired application. For example, if the packaging is used to package pharmaceuticals, the packaging may include UV- and moisture-resistant coatings to protect the pharmaceuticals from outside UV light or moisture during transport, storage, or both.

The packaging may include a board. The board may function to support or at least partially enclose a blister. The board may increase structural integrity of the blister. The board may secure the blister during use by a consumer. The board may provide access to a portion of the blister. The board may facilitate at least a portion of the blister being opened. The board may be a single layer or may include a plurality of layers secured to each other. For example, the board may be a single layer disposed over a surface of the blister.

The board may be made from any desired materials. It is contemplated that a variety of materials may be suitable to form the board. The board may be formed of one or more recyclable materials. The one or more recyclable materials may be paperboard, cardboard, corrugated fiberboard, polyethylene terephthalate (PET), high-density polyethylene (HDPE), polyvinyl chloride (PVC), low-density polyethylene (LDPE), polypropylene (PP), polystyrene (PS), acrylic, nylon, polycarbonate, polylactic acid, or a combination thereof.

The board may be manufactured using a variety of methods. The board may be thermoformed, cold pressed, stamped, molded, corrugated, calendering, or a combination thereof. The board may be die cut or trimmed to form a desired shape of the board. As a result, the board my include one or more holes, punch outs, perforations, or a combination thereof.

The holes may function to provide access to foil of the packaging, the blister, or both. The holes may be positioned anywhere along the board. The holes may be integrally formed with the board. The holes may be any desired size and/or shape, such as, but not limited to, circular, oval, triangular, square, rectangular, trapezoidal, or a combination thereof. The holes may be positioned to at least partially align with a portion of the blister, such as one or more cavities. The holes may extend through an entire thickness of the board or may only extend through a portion of the thickness of the board.

A shape and/or dimensions of the holes may be defined by an outer perimeter. The outer perimeter may be one or more edges of the board. The one or more edges may be interior edges (i.e., not a peripheral edge) of the board. For example, holes may be cut directly through an interior portion of the board so that a shape of the holes is formed by the interior cut edges of the board. The outer perimeter may be substantially uniform or non-uniform. The outer perimeter may be generally smooth or jagged. The outer perimeter may have a straight edge, a chamfered edge, a fillet, or a combination thereof. The outer perimeter may have one or more arcuate portions, one or more linear segments, or both. The outer perimeter may also include one or more opening features.

The opening feature, as discussed below, may function to pierce, puncture, tear, or a combination thereof foil of the packaging. The opening feature may be positioned anywhere along the packaging. However, it is envisioned that the opening feature may be located along the outer perimeter of the hole, adjacent to the hole, along a central portion of the hole, or a combination thereof. The opening feature may be a projection extending from the outer perimeter. The opening feature may be a bump-out, a step, a lip, a ledge, or a combination thereof. The opening feature may extend towards a central portion of the hole. The opening feature may recede (e.g., extend away) from the central portion of the hole. The opening feature may be a cutout, notch, groove, channel, or a combination thereof.

The opening feature may include a score line. The score line may facilitate bending, flexing, or both of the opening feature. Thus, it is envisioned that, when a force is applied to the opening feature, the score line may allow the opening feature to flex in a desired manner to pierce, puncture, tear, or otherwise open the foil of the packaging. The score line may extend through an entire thickness of the board or only a portion of the board to maintain integrity of the board. The score line may be positioned anywhere along the opening featuring. However, it is envisioned that the score line my be located near an end of the opening feature that opposes the end of the opening feature that contacts the foil during movement. The score line may vary in dimensions. For example, the score line may extend along a width of the or length of the opening feature, or the score line may terminate prior to reaching terminal ends of the opening feature.

Each hole may have a single opening feature. Each hole may have a plurality of opening features. Some or all of the holes may be free of opening features. For example, a first portion of the holes may include an opening feature while a second portion of the holes may be free of an opening feature.

The opening features may be positioned anywhere along the holes. The opening features may be located along a longitudinal axis of the holes, a latitudinal axis of the holes, somewhere therebetween, or a combination thereof. The opening features may be any desired size and/or dimensions based on a size of the holes. For example, a larger hole may require an opening feature extending inwardly toward a central portion of the hole. The opening features may be a tooth, point, edge, corner, or a combination thereof. It is envisioned that the opening features may include one or more points having a substantially sharp point of contact to rupture, pierce, cut, or a combination thereof the foil.

The foil may enclose the one or more items within the substrate to protect the one or more items from moisture, debris, light, damage, or a combination thereof. The foil may be connected to the blister via adhesive, heat-scaling, mechanical interlocking, other methods, or a combination thereof. The foil may be any desired gauge (i.e., thickness) based on a given application. The foil may any material, such aluminum, other metals, plastics, or a combination thereof. The foil may have dimensions similar or dissimilar to the blister, board, or both.

The packaging may be a multi-layered structure. The packaging may include a first layer of the board, a second layer of the blister, and an intermediate layer of the foil. Therefore, the foil may be sandwiched between the board and the blister. Thus, the board may at least partially protect the foil from unwanted puncture in desired locations. For example, the board may protect the foil in any area free of holes. Additionally, the holes may be perforated and include an inner cutout that may be removed to expose the foil before opening a cavity of the blister.

Turning now to the figures, FIG. 1 illustrates a top view of packaging 10 in accordance with the present teachings. The packaging 10 may include a blister (not shown) secured to a board 12. The board 12 may include one or more holes 20 positioned along the board to align with cavities (not shown) of the blister. The holes 20 may be positioned anywhere along the board 12 to enable a user to remove an item from the cavities through the holes 12 (see FIG. 2). It is contemplated that an axis of the holes 20 may substantially align, or be coaxial with, an axis of the cavity. For example, a center point along a length and width of the holes 20 may align with a center point along a length and width of the cavities. However, it should be noted that the holes 20 may not entirely align with the cavities of the blister. For example, the holes 20 may be offset from an axis of the cavities so that only a portion of the hole 20 is located over the cavity.

The holes 20 may include an outer perimeter 22 that defines a size and/or shape of the holes 20. The outer perimeter 22 may be formed by an edge of the board 12. For example, the holes 20 may be punched and/or cut out directly from the board 12 so that inner edges created by the punching and/or cutting operation define the outer perimeter 22. The outer perimeter 22 may be substantially linear, may contain one or more arcuate portions, or both. The outer perimeter 22 may generally form a shape of the hole 20 that matches a shape of an opening of the cavity. For example, the outer perimeter 22 may form a generally oval hole 20 that aligns with a generally oval opening of the cavity.

While the outer perimeter 22 may form a generally uniform shape of the hole 20, one or more opening features 24 may be present. The opening features 24 may extend along the outer perimeter 22 of the hole 20. As illustrated, the opening features 24 may project inwardly toward a central area of the hole to be disposed substantially over the opening of the cavity. The opening features 24 may be adapted to ease opening of the blister. For example, the blister may include a foil 16 positioned between the blister and the card. The foil 16 may secure one or more items in the cavities of the blister to prevent damage to the items caused by debris, moisture, exposure to an environment, or a combination thereof. During an opening process of the cavities, the foil 16 may be punctured by the opening features 24, thereby casing the opening operation (see FIG. 2).

The opening features 24 may be positioned anywhere along the outer perimeter 22 of the holes 20. As shown, a plurality of opening features 24 may be located along a single outer perimeter 22. For example, as illustrated, a pair of opposing opening features 24 may be located on opposite sides of a hole 20 to puncture the foil 16 during an opening process. It should be noted that, while the holes 20 located along the board 12 are uniform, a variety of hole 20 shapes and/or sizes may be present along a single board 12.

Figure 2:
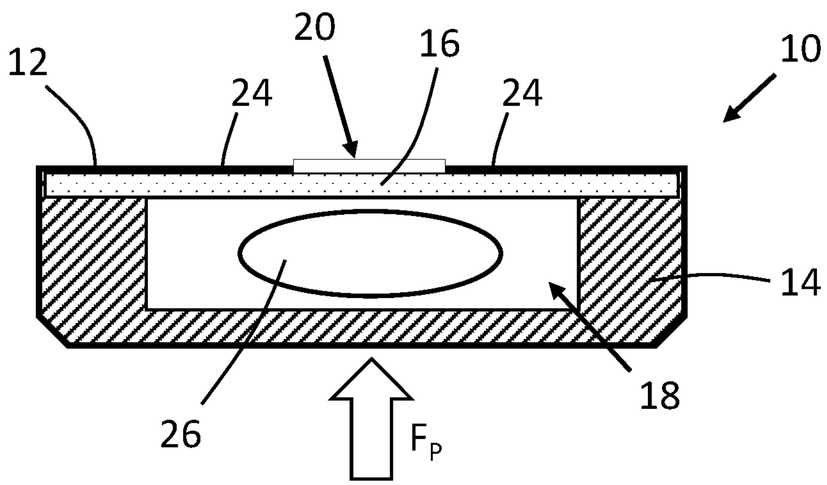
FIG. 2 is cross-section 2-2 of the packaging of FIG. 1.

FIG. 2 illustrates cross-section 2-2 of the packaging 10 of FIG. 1. As shown, the card 12 is disposed over and secured to a blister 14. The blister 14 may include a cavity 18 that houses one or more items 26 (e.g., medication, toiletries, cosmetics, cleaning supplies, food, etc.) in a controlled environment. The cavity 18 may provide a secure environment for the items 26 due to a foil 16 disposed over the cavity 18 between the cavity 18 and the board 12. The foil 16 may seal the cavity 18 to prevent contamination of the items 26 located inside.

A single blister 14 may contain a plurality of cavities 18 so that the plurality of holes 20 of the board 12 align with the plurality of cavities 18. However, it is also possible that a plurality of blisters 14 are secured to a single board 12, or vice versa. For example, a plurality of blisters 14 each having a single cavity 18 may be secured to a single board 12 having a plurality of holes 20. Therefore, it may be gleaned from the present teachings that many configurations are possible based on a desired application.

As shown, a pair of opening features 24 located along an outer perimeter of the hole 20 are integrally formed (i.e., monolithically formed) with the board 12. The opening features 24 extend inwardly toward a central portion of the hole 20 so that the opening features 24 are positioned over the cavity 18. The hole 20 is substantially aligned with the cavity 20 and exposes the foil 16 disposed between the board 12 and the blister 14. It should be noted that only a portion of the foil 16 may be exposed by the holes 20. For example, the foil 16 may be coextensive, extend beyond, one or more terminal edges of the board 12, the blister 14, or both. Alternatively, the foil 16 may be contained within an outer perimeter of the board 12, the blister 14, or both. For example, the foil 16 may abut an outer lip or flange along an outer perimeter of the board 12, the blister 14, or both.

During an opening operation, a user (or machine and/or tool) may apply a force (FP) to the blister 14. Based on this application of force (Fp), the cavity 18 may be compressed so the one or more items 26 located within the cavity 18 push against an inner surface of the foil 18. The foil 18 in turn is compressed against the outer perimeter of the hole 20 formed by the board 12. At this point during the operation, a conventional hole free of opening features may require additional excess force by the user to puncture or tear the foil 16 and allow the one or more items 26 located within the cavity 18 to be retrieved. However, as a result of the opening features 24 being positioned over the foil 16, a user may advantageously require less force to puncture and/or tear the foil 16. The foil 16 may push upwards and into the jagged design of the opening features 24, thereby more easily puncturing the foil 16. Once the foil 16 has been punctured, the one or more items 26 within the cavity 18 may be easily removed from the cavity 18.

Figure 3:
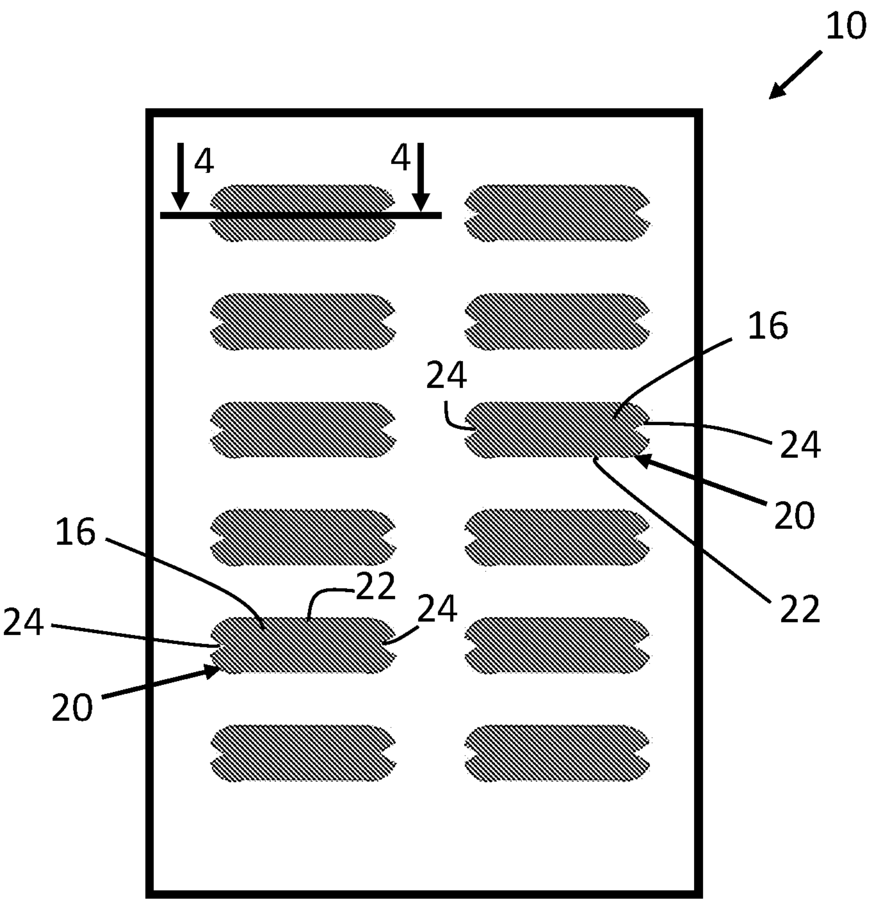
FIG. 3 is a top view of packaging in accordance with the present teachings.

FIG. 3 illustrates a top view of packaging 10 in accordance with the present teachings. The packaging 10 may include a blister (not shown) secured to a board 12. Similar to FIG. 1, a foil 16 may be disposed between the board 12 and the blister to seal one or more cavities located along the blister. The board 12 may further include a plurality of holes 20. A size and/or shape of each hole 20 may be defined by an outer perimeter 22.

Figure 4:
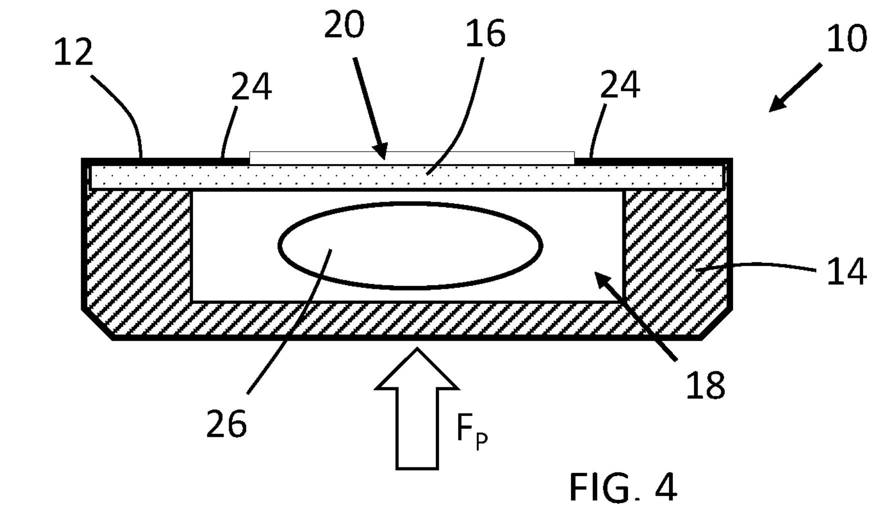
FIG. 4 is cross-section 4-4 of the packaging of FIG. 3.

The holes 20 may expose portions of the foil 16 that are located over the cavities of the blister so that a user may access the foil 16 during an opening operation (see FIG. 4). Like FIG. 1, the holes 20 may include one or more opening features 24 extending along the outer perimeter 22 of each hole. However, in comparison to FIG. 1, the opening features 24 may be positioned substantially along a longitudinal axis of each hole 20 instead of a latitudinal axis. It should be noted, however, that the opening features 24 may be located anywhere along the outer perimeter 22.

The opening features 24 may be any desired size and/or shape. As shown, the opening features 24 may one or more teeth extending inwardly into the central area of the hole 20 to form a substantially sharp point to puncture and/or tear the foil 16 during opening. However, the opening features 24 may only project inwardly a sufficient distance to puncture the foil 16 yet still allow removal of an item located within the cavity of the blister. For example, the opening features 24 may be substantially free of contact and/or obstruction of the item when removing the item from the cavity.

Alternatively, the opening features 24 may extend along the outer perimeter 22 so that the opening features 24 contact the item when removing the item from the cavity. In this particular instance, the opening features 24 may bend, deflect, fold, break, or a combination thereof to allow a user to remove the item from the cavity. As such, it is envisioned that the opening features 24 may require a bending force greater than a breaking force of the foil 16. Thus, the opening features 24 may act as a secondary securing mechanism to ensure an item stays within a cavity after the foil 16 is punctured until a user wants to remove the item (i.e., the opening features 24 may prevent accidental dropping or removal of the items in the cavities).

FIG. 4 illustrates cross-section 2-2 of the packaging of FIG. 1. As shown the card 12 is disposed over and secured to a blister 14. The blister 14 may include a cavity 18 that houses an item 26 in a controlled environment due to a foil 16 disposed over the cavity 18 between the cavity 18 and the board 12.

As illustrated, a pair of opening features 24 located along an outer perimeter of the hole 20 are integrally formed with the board 12. The opening features 24 extend inwardly toward a central portion of the hole 20 so that the opening features 24 are positioned over the cavity 18. The hole 20 is substantially aligned with the cavity 20 and exposes the foil 16 disposed between the board 12 and the blister 14. The opening features 24 may extend inwardly toward the central portion of the hole 20 near edges of the cavity 18 to substantially prevent obstruction of the item 26 when being removed from the cavity 18. Therefore, the opening features 24 may be substantially rigid or may be flexible. However, the opening features 24 may be rigid enough to puncture the foil 18 during opening.

During an opening operation, a user (or machine and/or tool) may apply a force (FP) to the blister 14. Based on this application of force (FP), the cavity 18 may be compressed so the one or more items 26 located within the cavity 18 push against an inner surface of the foil 18. The foil 18 in turn is compressed against the outer perimeter of the hole 20 formed by the board 12. The foil 16 may push upwards and into the sharp point of the opening features 24, thereby more easily puncturing the foil 16. Once the foil 16 has been punctured, the one or more items 26 within the cavity 18 may be easily removed from the cavity 18.

Figure 5:
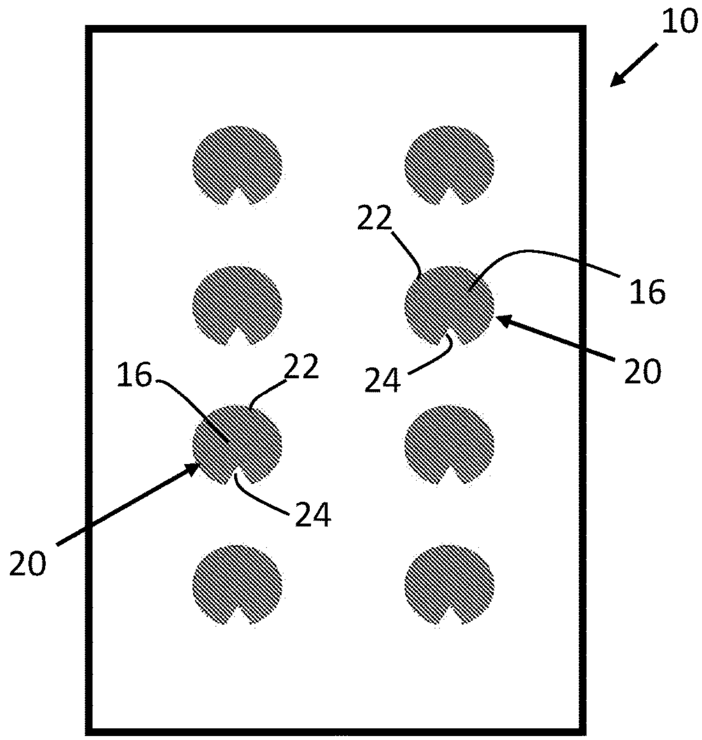
FIG. 5 is a top view of packaging in accordance with the present teachings.

FIG. 5 illustrates a top view of packaging 10 in accordance with the present teachings. The packaging 10 may include a blister (not shown) secured to a board 12. A foil 16 may be disposed between the board 12 and the blister to seal one or more cavities located along the blister. The board 12 may further include a plurality of holes 20. Dimensions of each hole 20 may be defined by an outer perimeter 22.

As illustrated, the holes 20 may be substantially circular in comparison the substantially oval shape of the holes in FIGS. 1 and 3. Thus, it may be gleaned from the present teachings that the dimensions of the holes 20 may based on a given application. The dimensions of the holes 20 may be dictated by an item being stored in the cavities of the blister. For example, if a circular pill is stored within the cavity of the blister, the hole 20 may be circular. Similarly, if a pill stored within the cavity is oval in shape, the hole 20 may be oval. However, it should be noted that the holes 20 may not correspond to a shape of an item within the blister, and the dimensions of the holes 20 may be selected based an any other needs, such as user access, manufacturing limitations, material limitations, design needs, or a combination thereof.

The holes 20 may include an opening feature 24 extending along the outer perimeter 22 of each hole 20. As illustrated, the opening feature 24 may extend inwardly towards a central portion of the hole 20 adjacent to the foil 16. The opening feature 24 may extend to form a tooth-like shape that narrows to form a substantially sharp point. The sharp point may be adapted to pierce or tear the foil 16 during opening so that a user may more easily access an item located within the cavity of the blister.

Figure 6:
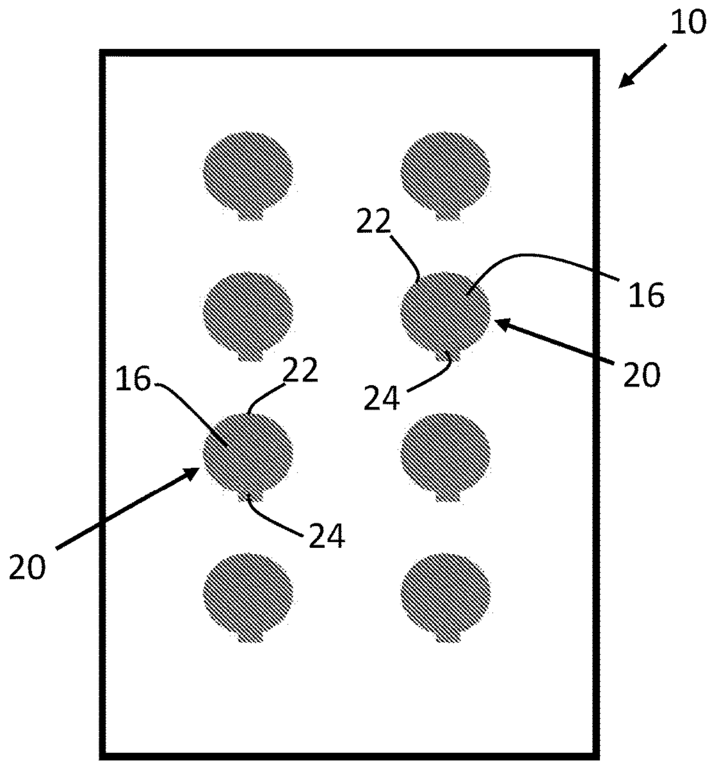
FIG. 6 is a top view of packaging in accordance with the present teachings.

FIG. 6 illustrates a top down view of packaging 10 similar to the packaging of FIG. 5. As shown, the packaging 10 includes a blister secured to a board 12. The foil 16 is disposed between the board 12 and the blister to seal cavities of the blister. The board 12 further includes a plurality of substantially circular holes 20 that exposes portions of the foil 16 positioned over the cavities of the blister.

The holes may include an opening feature 24 along an outer perimeter 22 of the holes 20. While FIG. 5 illustrates an opening feature projecting inwardly toward a central portion of the hole, FIG. 6 illustrates that the opening feature 24 may also extend outwardly away from the center of the hole 20. As shown, the opening feature 24 may be a cutout portion of the outer perimeter 22. The opening feature 24 may form a step, bump-out, keyhole, or a combination thereof. It is envisioned that the opening feature 24 in FIG. 6 may provide a pair of sharp points near opposing sides of the opening feature 24 to pierce or tear the foil 16 during opening.

Figure 7:
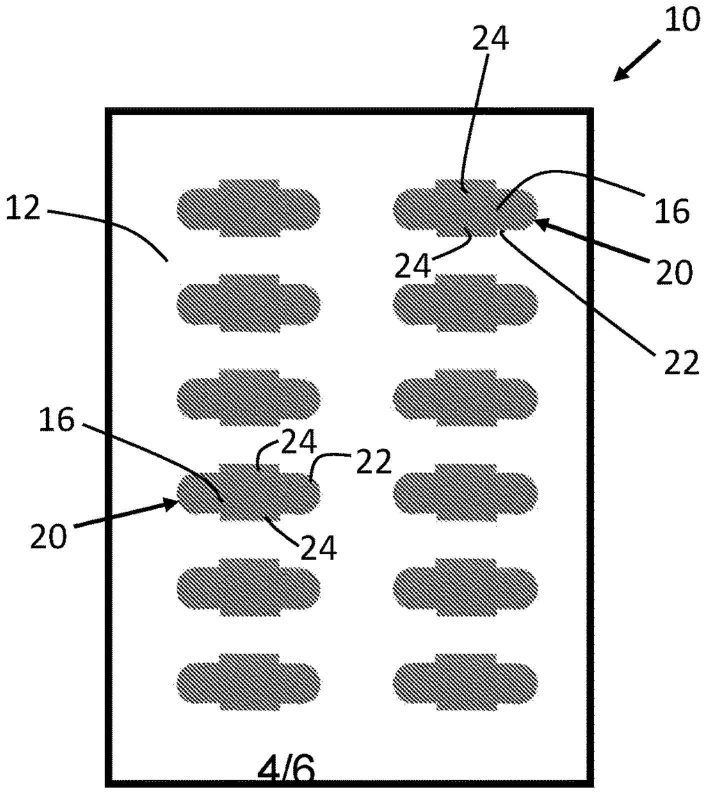
FIG. 7 is a top view of packaging in accordance with the present teachings.

FIG. 7 illustrates a top view of packaging 10 in accordance with the present teachings. The packaging 10 may include a blister (not shown) secured to a board 12. A foil 16 may be disposed between the board 12 and the blister to seal one or more cavities located along the blister. The board 12 may further include a plurality of holes 20. Dimensions of each hole 20 may be defined by an outer perimeter 22.

As shown, the substantially oval holes 20 may include a pair of opposing opening features 24 extending outwardly away from a center-point of the hole 20. Similar to FIG. 6, the opening features 24 may be a cutout, bump-out, step, or a combination thereof. The opening features 24 may also include a plurality of sharp points, such as the substantially orthogonal corners formed along the outer perimeter 22 by the opening features 24, to help pierce or tear the foil 16 more easily during opening of the blister cavities.

Figure 8:
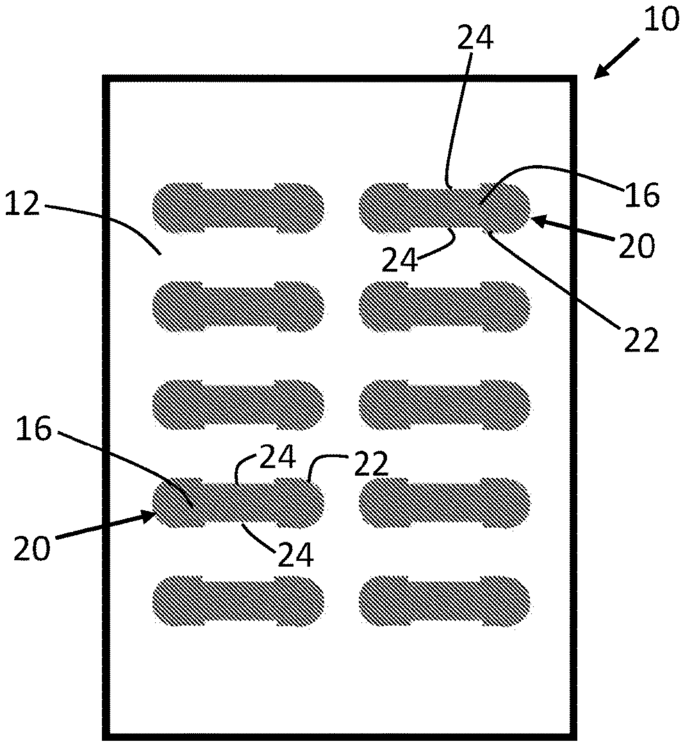
FIG. 8 is a top view of packaging in accordance with the present teachings.

FIG. 8 illustrates a top down view of packaging 10 similar to the packaging of FIG. 7. The packaging 10 includes a blister (not shown; see FIGS. 2 and 4) secured to a board 12. Foil 16 is disposed between the board 12 and the blister to seal cavities of the blister. The board 12 may further include a plurality of substantially oval holes 20 that expose portions of the foil 16.

All or some of the holes 20 may include one or more opening features 24. The opening features 24 may be positioned on opposing sides of an outer perimeter 22 of the holes 20. As shown, the opening features 24 may extend inwardly towards a central portion of the holes 20 to form a plurality of corners. While the corners are shown as substantially right angles, it should be noted that the opening features 24 may form any desired angle at each corner. Some opening features 24 may form a single corner while other opening features 24 may form a plurality of corners. The opening features 24, and more specifically, the corners of the opening features 24 may pierce or cut through the foil 16 during opening when a force is applied to the blister, causing the foil 16 to be pushed against the opening features 24 and the outer perimeter 22 of the holes 20.

Figure 9:
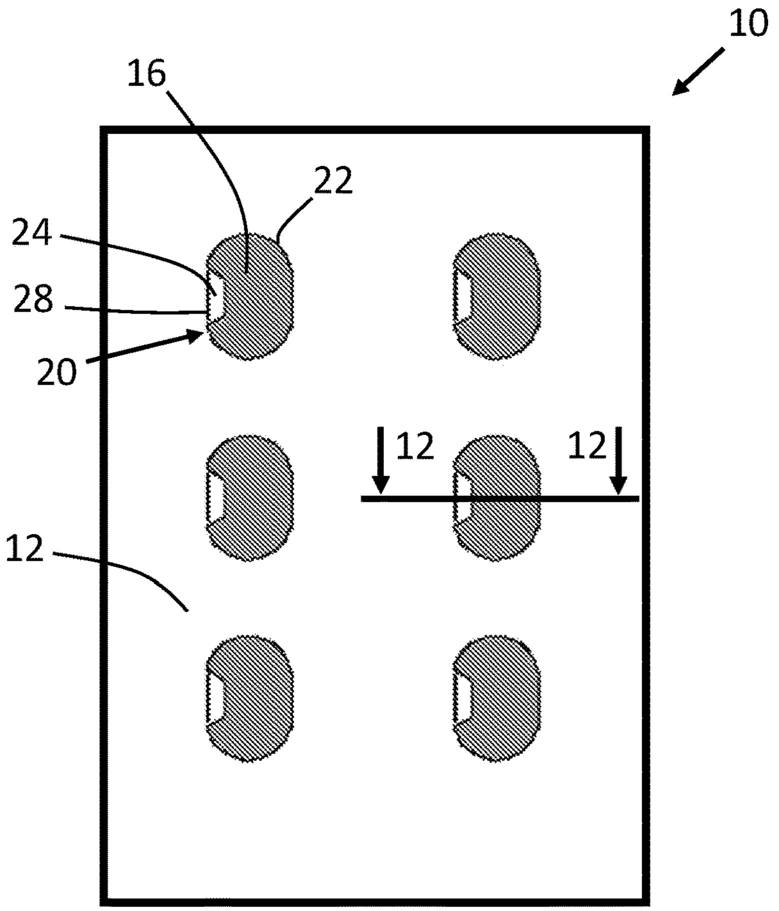
FIG. 9 is a top view of packaging in accordance with the present teachings.

FIG. 9 illustrates a top view of packaging 10 in accordance with the present teachings. The packaging 10 may include a blister (not shown) secured to a board 12. A foil 16 may be disposed between the board 12 and the blister to seal one or more cavities located along the blister (see FIG. 12). The board 12 may further include a plurality of holes 20 such that the holes 20 at least partially align with the cavities of the blister. Dimensions of each hole 20 may be defined by an outer perimeter 22.

As shown, the holes 20 may be substantially oval in shaped and may be dimensionally configured based on the size of the cavities, the size of one or more items located within the cavities, or both. For example, it is envisioned that the holes 20 may be sufficiently large to allow removal of a pill from the cavity when the foil 16 is punctured.

The holes 20 may include an opening feature 24 extending along the outer perimeter 22 or each hole 20. As shown, the opening feature 24 may extend inwardly towards a central portion of the hole 20 adjacent to the foil 16. The opening feature 24 may extend to form one or more sharp points that are adapted to pierce, tear, or otherwise puncture through the foil 16 during an opening process so that a user may more easily access an item located within the cavity of the blister. As shown, the opening feature 24 may extend along a lateral side of the outer perimeter 22 of the hole 20 to form a pair of points that extend towards the central portion of the hole 20. However, any number of points (e.g., no points, one point, two points, three points, etc.) may be present.

Figure 10:
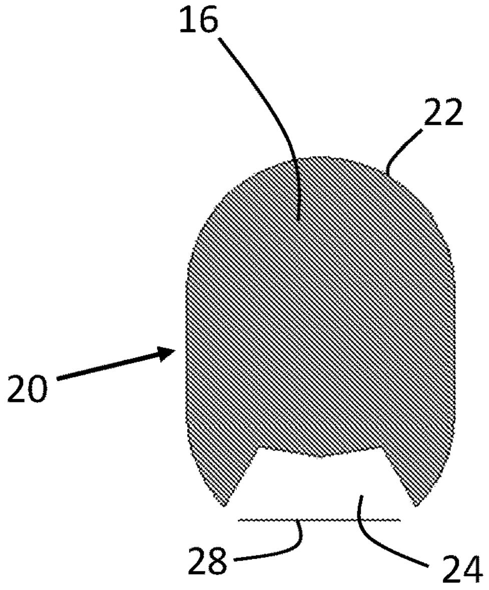
FIG. 10 is a close-up view of an opening and opening feature for packaging in accordance with the present teachings.
Figure 11:
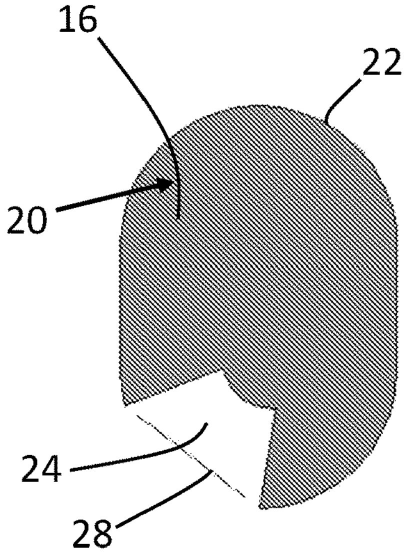
FIG. 11 a close-up view of an opening and opening feature for packaging in accordance with the present teachings.

FIGS. 10 and 11 illustrate close-up views of opening features 24 for cavities in the packaging as described below. As shown and discussed above, the hole 20 may be defined by an outer perimeter 22 and covered by a foil 16 extending across the hole 20. An opening feature 24 may extend inwardly towards a central portion of the hole 20 from the outer perimeter 22 or a portion of the board (see FIG. 9). For example, as illustrated in FIGS. 10 and 11, the opening feature 24 may be an extension of the board and be defined by an end that makes contact with the foil 16 and a score line 28. The score line 28 may extend along a perimeter or width of the opening feature 24. As shown, the score line 28 may extend along the width of the opening feature 24 to establish a bend or inflection point, yet the score line 28 may terminate prior to reach terminal sides of the opening feature 24. However, it is envisioned that the score line 28 may also extend along an entire width of the opening feature 24 between opposing terminal sides.

The opening feature 24 may also be positioned anywhere along the outer perimeter 22 of the hole 20. For example, the opening feature 24 may be located along a lower end portion or point to project substantially axially into the central portion of the opening feature 24 along a longitudinal axis of the hole 20 (FIG. 10) or may be positioned along an arcuate portion of the hole 20 to project inwardly at an angle relative to the longitudinal axis of the hole 20. Such an angle may be about 30 degrees or more, about 45 degrees or more, or about 60 degrees or more. The angle may be about 120 degrees or less, about 100 degrees or less, or about 90 degrees or less.

Figure 12:
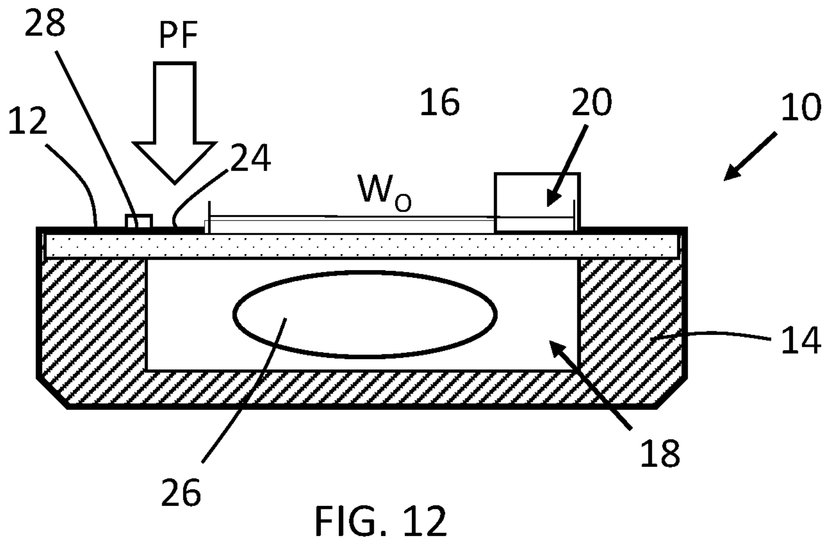
FIG. 12 is cross-section 12-12 of the packaging of FIG. 9.

FIG. 12 illustrates cross-section 12-12 of the packaging 10 of FIG. 9. As shown, the card 12 is disposed over and secured to a blister 14. The blister 14 may include a cavity 18 that houses an item 26 in a controlled environment, such as a pill or other form of medicine due to a foil 16 disposed over the cavity 18 between the blister 14 and the board 12.

An opening feature 24 located along an outer perimeter of the hole 20 may be integrally formed with the board 12. The opening feature 24 extends inwardly toward a central portion of the hole 20 so that the opening feature 24 is positioned over the cavity 18. The hole 20 is substantially aligned with the cavity 20 and exposes the foil 16 disposed between the board 12 and the blister 14 so that the foil 16 may be punctured by opening feature 24 with interference from the blister 14. As described above, the opening feature 24 may be flexible enough to deflect towards the foil 16 yet be substantially rigid to puncture or otherwise open the foil 18 to remove the item 26 from the cavity 18.

During an opening operation, a user may apply a puncture force (PF) to the opening feature 24. It should be noted that such a puncture force (PF) may be applied to the opening feature 24 directly as opposed to a force applied to the blister 13 that is described above (see FIG. 4). Due to the puncture force (PF) being applied, the opening feature 24 may deflect towards the foil 18 and pivot or otherwise bend due to the score line 28 along the opening feature 24 and/or the board 12. As a result, one or more points or other portions of the opening feature 24 may contact the foil 18 and puncture, pierce, or otherwise open the foil 16. Once the foil 16 has been puncture, the item 26 within the cavity 18 may be easily removed from the cavity 18.

It should be noted that a width of the opening (Wo) may be greater than or equal to a width of the item 26 within the cavity 18. As such, the opening feature 24 may beneficially extend inwardly over the hole 20 so that the opening feature 24 may puncture the foil 18 without contacting the item 26. Thus, the present teachings may provide an opening feature 24 that beneficially opens packaging 10 without damaging an item 26 stored therein. That is, the opening feature 24 may extend inwardly along the hole 20 yet not be positioned over the item 26 itself. Similarly, it should be noted that by applying a force directly to the opening feature 24 and not the blister 14, a user may advantageously open and remove an item without accidently forcing the item 26 through the foil 16 and out of the cavity 18. Such accidental removal may often result in dropping the item 26 or otherwise damaging the item 26.

| ELEMENT LIST | |
|---|---|
| 10 | Packaging |
| 12 | Board |
| 14 | Blister |
| 16 | Foil |
| 18 | Cavity |
| 20 | Hole |
| 22 | Outer Perimeter of the Hole |
| 24 | Opening Feature |
| 26 | Item |
| 28 | Score Line |
| $F_P$ | Push-Out Force |
| PF | Puncture Force |
| $W_O$ | Width of the Cavity Opening |

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A packaging comprising:

(a) a blister having a cavity;

(b) a foil disposed over an opening of the cavity and secured to the blister; and (c) a board disposed over the foil having a hole, wherein a shape of the hole is formed by an outer perimeter and the outer perimeter includes an opening feature that ruptures the foil during opening of the blister due to a force being applied to the opening feature, wherein the opening feature includes a score line that determines a flexing point of the opening feature, wherein a force to flex the opening feature is greater than a force to rupture the foil.

2. The packaging of claim 1, wherein during opening of the blister, a force is applied to the opening feature to deflect the opening feature towards the foil.

3. The packaging of claim 1, wherein the board is heat-sealed to the blister.

4. The packaging of claim 1, wherein the opening feature extends inwardly towards a central portion of the hole.

5. The packaging of claim 1, wherein the opening feature extends outwardly away from a central portion of the hole.

6. The packaging of claim 1, wherein the opening feature forms a point or corner that ruptures the foil.

7. The packaging of claim 1, wherein opening of the blister is completed to express a pill located in the cavity.

8. The packaging of claim 7, where the opening feature is free of contact with the pill during expression.

9. The packaging of claim 1, wherein the score line at least partially extends through a thickness of the board to define an end of the opening feature that opposes an end of the opening feature that contacts the foil.

10. The packaging of claim 1, wherein the opening feature is a pair of points forming to rupture the foil.

11. The packaging of claim 1, wherein the opening feature is a cutout along the outer perimeter, and the cutout forms a corner to rupture the foil.

12. The packaging of claim 1, wherein the outer perimeter and the opening feature form a keyhole shape.

13. The packaging of claim 1, wherein the opening feature is monolithically formed with the outer perimeter.

14. The packaging of claim 13, wherein the outer perimeter is defined by an interior edge of the board.

15. The packaging of claim 1, wherein the foil is coextensive with the board.

16. The packaging of claim 1, wherein the foil seals the cavity to prevent contamination of an item located inside the cavity.

17. The packaging of claim 1, wherein a force to rupture the foil with the hole having the opening feature is less than a force to rupture the foil with a hole free of any opening feature.

18. The packaging of claim 1, wherein the opening feature is positioned substantially along a longitudinal axis of the hole, a latitudinal axis of the hole, or both.

* * * * *